United States Patent [19]

White

[11] 4,264,930
[45] Apr. 28, 1981

[54] CHARGE COUPLED DEVICE INCORPORATING LAPLACIAN THRESHOLDING WITH TDI ARRAY

[75] Inventor: James M. White, Charlotte, N.C.

[73] Assignee: International Business Machines Corporation, Armonk, N.Y.

[21] Appl. No.: 102,007

[22] Filed: Dec. 10, 1979

[51] Int. Cl.³ .............................................. H04N 3/14
[52] U.S. Cl. .................................................. 358/213
[58] Field of Search ........................ 358/213, 212, 41

[56] References Cited

U.S. PATENT DOCUMENTS

| 4,010,319 | 3/1977 | Levine ................................ 358/213 |
| 4,011,441 | 3/1977 | Michon et al. ....................... 358/213 |
| 4,129,887 | 12/1978 | Michon ................................ 358/213 |
| 4,178,614 | 12/1979 | Sauer .................................. 358/213 |

*Primary Examiner*—Richard Murray
*Attorney, Agent, or Firm*—Pollock, Vande Sande & Priddy

[57] ABSTRACT

A CCD imaging array is operated in a time delay and integration mode to generate an array of charge packets corresponding to the light intensity at the picture elements of an irradiating image. The charge packets from the imaging array are gated in parallel to a line image storage array that stores n rows of charge packets in a columnar relation. A replicator circuit generates a replicated sum charge for each column of charge packets of the line image storage array. Each replicated sum charge corresponds to the sum of the n charges stored in a column at a particular instant in time and the charge stored at the (n+1)/2 position of each column is the middle charge for the associated replicated sum charge. Parallel delay gating electrodes gate a row of replicated sum charges to an area average serial shift register at the same time that a row of corresponding middle charges is gated into a focused element serial shift register. The serial shift registers are gated synchronously in a serial fashion and, as the registers are gated, the endmost n replicated sum charges are summed by a horizontal summer and $1/n^2$ of the sum is subtracted by a comparator from an associated central charge stored in the focused element serial shift register. The difference is the Laplacian for the central charge. The output of the focused element serial shift register, the summer output, and the Laplacian are useful for subsequent image processing.

10 Claims, 8 Drawing Figures

| 1P1 | 2P1 | 3P1 | 4P1 | 5P1 | 6P1 | 7P1 |
|---|---|---|---|---|---|---|
| 1P2 | 2P2 | 3P2 | 4P2 | 5P2 | 6P2 | 7P2 |
| 1P3 | 2P3 | 3P3 | 4P3 | 5P3 | 6P3 | 7P3 |
| 1P4 | 2P4 | 3P4 | 4P4 | 5P4 | 6P4 | 7P4 |
| 1P5 | 2P5 | 3P5 | 4P5 | 5P5 | 6P5 | 7P5 |
| 1P6 | 2P6 | 3P6 | 4P6 | 5P6 | 6P6 | 7P6 |
| 1P7 | 2P7 | 3P7 | 4P7 | 5P7 | 6P7 | 7P7 |

FIG. 1

| 1P1 | 2P1 | 3P1 | 4P1 | 5P1 | 6P1 | 7P1 |
|-----|-----|-----|-----|-----|-----|-----|
| 1P2 | 2P2 | 3P2 | 4P2 | 5P2 | 6P2 | 7P2 |
| 1P3 | 2P3 | 3P3 | 4P3 | 5P3 | 6P3 | 7P3 |
| 1P4 | 2P4 | 3P4 | 4P4 | 5P4 | 6P4 | 7P4 |
| 1P5 | 2P5 | 3P5 | 4P5 | 5P5 | 6P5 | 7P5 |
| 1P6 | 2P6 | 3P6 | 4P6 | 5P6 | 6P6 | 7P6 |
| 1P7 | 2P7 | 3P7 | 4P7 | 5P7 | 6P7 | 7P7 |

| FIG.4A | FIG.4B |

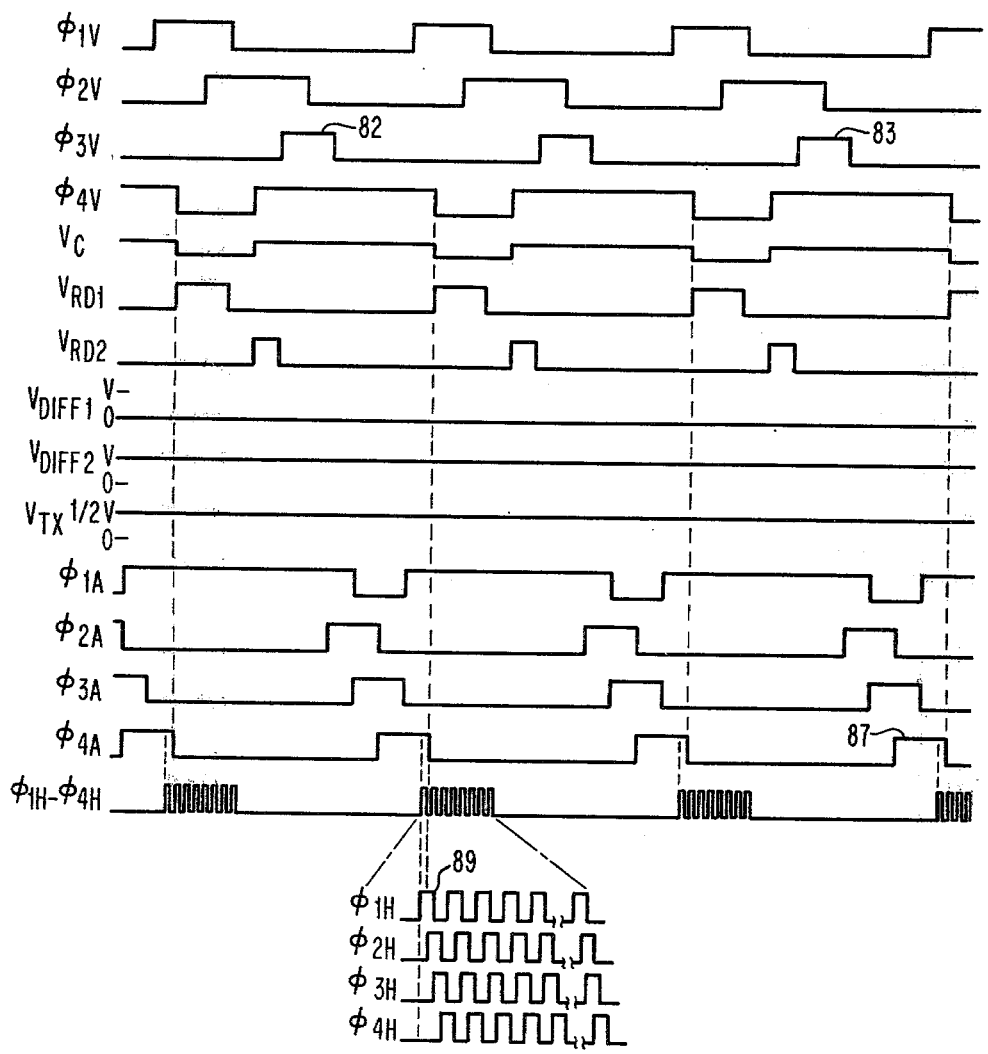

CHARGE COUPLED DEVICE INCORPORATING LAPLACIAN THRESHOLDING WITH TDI ARRAY

DESCRIPTION

1. Technical Field

The invention relates to charge coupled imaging devices and, more particularly, to a CCD device including a CCD imaging array that is operated in the time delay and integration mode to generate a two dimensional array of charge packets corresponding to the picture elements of an incident light image and further including a CCD gating and charge replicating apparatus that averages the two dimensional charge packets in parallel by columns and then derives area averages for particular picture elements of the image by a horizontal integration.

2. Background Art

It is known to those skilled in the electrical arts that a charge coupled device (CCD) array may be employed to provide an electrical representation of an incident light image by generating charge packets corresponding to the light intensity of picture elements (pels) of the image. It is also known that the light sensitivity of the CCD array may be increased if the array is operated in a time delay and integration mode.

The imaging capability of a CCD array may be further enhanced by deriving the second derivative, or Laplacian, for the picture elements of the image and thereby defining the edge transitions of the image more clearly. In *Digital Picture Processing*, by Aziel Rosenfeld and Avinash C. Kak, at Section 6.4, pages 179–191, it is indicated that the second derivative (Laplacian) for each picture element of a light image may be approximated by computing the difference between the light intensity measured at a picture element and the average light intensity measured in an area surrounding the picture element.

Prior art CCD imagers have derived the Laplacian for each picture element of an image by irradiating a CCD array with a focused image to form charge packets proportional to the focused light intensity at the picture elements of the image and then irradiating the CCD array with the unfocused image to form charge packets proportional to the average light intensity around each picture element. The unfocused charge packets are then subtracted from the corresponding focused charge packets to derive the Laplacian for each picture element. Such focus/defocus prior art imaging apparatus has tended to be fairly expensive and complicated since, in order to generate the charge data, the apparatus must either split an image into focused and unfocused components to irradiate separate CCD arrays or must opto-mechanically switch a focused and unfocused image to irradiate a single CCD array.

A more efficient means of computing the Laplacian is disclosed in a paper, "A Multiple Output CCD Imager for Imaging Processing Applications", by J. E. Hall, J. F. Brietzmann, M. M. Blouke, J. T. Carlo; Int. Electron Devices Meeting Tech. Digest, Washington, D.C., Dec. 4–6, 1978, pp. 415–418. The disclosed imaging device includes an imaging array and a peripherally placed serial register that is employed to serially gate line charge packets from the imaging array. Charge packets at particular points of successive imaged lines are tapped off at fixed points on the serial register and are summed to compute area averages for the picture elements of the image. The apparatus has the disadvantage that transfer inefficiencies in the serial gating process tend to degrade the electrical representation of the image in proportion to the number of transfers that are executed. Accordingly, the serial transfer summing apparatus becomes less accurate as the number of picture elements in the line of an image increases. Thus, the accuracy of the apparatus is significantly reduced for images having a relatively large number of picture elements, for example, on the order of 2000 pels per line. Also, the length of the serial register increases in proportion to the number of lines that are required to compute an area average and, due to transfer inefficiencies, the increased register length results in decreased accuracy.

In order to reduce the effect of transfer inefficiency in computing the second derivative, or Laplacian, it is necessary to compute area averages about individual pels of an image by summing a plurality of columns of pels in a parallel fashion. However, the parallel summing must not destroy the individual charge packets of the imaging array, since the individual charge packets must be available to compute the Laplacian at each pel.

Non-destructive summing has been used in the prior art to compute the values of the Hadamard matrices for semiconductor imaging arrays. For example, such systems are disclosed in the U.S. Patent to Engler, U.S. Pat. No. 4,011,442, "Apparatus for Sensing Optical Signals", issued Mar. 8, 1977; and the U.S. Patent to Michon, U.S. Pat. No. 4,129,887, "Solid Stage Imaging Apparatus", issued Dec. 12, 1978. However, such prior art apparatus has not been employed to compute area averages and to derive the second derivative (Laplacian) for the pels of an imaging array. In addition, prior art algebraic summing apparatus has tended to be somewhat complicated in structure and operation.

A relatively simple semiconductor apparatus for non-destructively replicating charge packets is disclosed in the U.S. Patents to Heller, U.S. Pat. Nos. 4,047,151, "Method and Apparatus for Replicating a Charge Packet", issued Sept. 6, 1977, and 4,035,667, "Input Circuit for Inserting Charge Packets into a Charge-Transfer Device", issued July 12, 1977. However, the disclosed charge replication devices have not been employed to generate area averages and to compute a second derivative for the picture elements of an image.

Accordingly, it is an object of the invention to provide a relatively simple and compact charge coupled device having means for quickly and accurately deriving a charge representation of a second derivative (Laplacian) for the picture elements of an irradiating image. A further object of the invention is to provide such a CCD device wherein area averages for particular picture elements are computed in parallel to reduce the effect of transfer inefficiency on the computation of the Laplacian.

Another object of the invention is to provide a CCD device wherein a relatively large picture element averaging area, for example 5 pels×5 pels, may be employed to derive a Laplacian without unduly reducing the accuracy of the computation.

A further object of the invention is to provide a Laplacian-generating CCD device that may be operated in conjunction with a CCD imager that is operated in a time delay and integration mode.

A further object of the invention is to provide such a Laplacian-generating CCD device with a structure that is sufficiently compact to fit on a single chip and that may operate with images having line widths greater than 2000 pels.

These and other objects of this invention will become apparent from a review of the detailed specification which follows and a consideration of the accompanying drawings.

DISCLOSURE OF THE INVENTION

In order to achieve the objects of the invention and to overcome the problems of the prior art the improved charge coupled device, according to the invention, includes a time delay and integration CCD imaging array that generates successive rows of charge packets corresponding to the light intensity of associated rows of picture elements of an incident light image.

A line image storage array is disposed to receive successive rows of charge packets from the TDI array and to store five rows of charge packets at one time, the rows being arranged in separate vertical summing columns.

A replicator summing means is provided to generate a replicated sum charge for each column of the line image storage array, each replicated sum charge is proportional to the sum of the charges stored in an associated column of the array. The third charge in the column associated with each replicated sum charge is designated the "middle charge" of the charge sum.

Parallel gating delay electrodes are employed to synchronize the gating of a row of replicated sum charges into an area average serial shift register with the gating of a row of associated middle charge packets into a focused element serial shift register.

The serial shift registers are then synchronously gated in a serial fashion and, as the registers are gated, the five endmost replicated sum charges are summed by a horizontal summing means and 1/25 of the charge sum thus derived is subtracted by a comparing means from an associated central charge that is stored in the focused element serial shift register. The difference charge at the output of the comparing means is proportional to the second derivative (Laplacian) of the stored central charge.

A preferred embodiment of the charge coupled device of the invention is implemented in a structure utilizing four phase clock gating and having two levels of polysilicon electrodes and a top level of aluminum cross-over electrodes.

BRIEF DESCRIPTION OF THE DRAWINGS

FIG. 1 illustrates a diagrammatic representation of a two dimensional array of charge packets corresponding to the picture elements of a portion of a light image.

FIGS. 2, 2A and 2B illustrate a block diagram of a CCD imaging device and Laplacian-generator in accordance with the invention.

FIG. 6 illustrates a timing diagram of the operational signals for the CCD device of FIG. 2.

BEST MODE FOR CARRYING OUT THE INVENTION

Figure 2A:
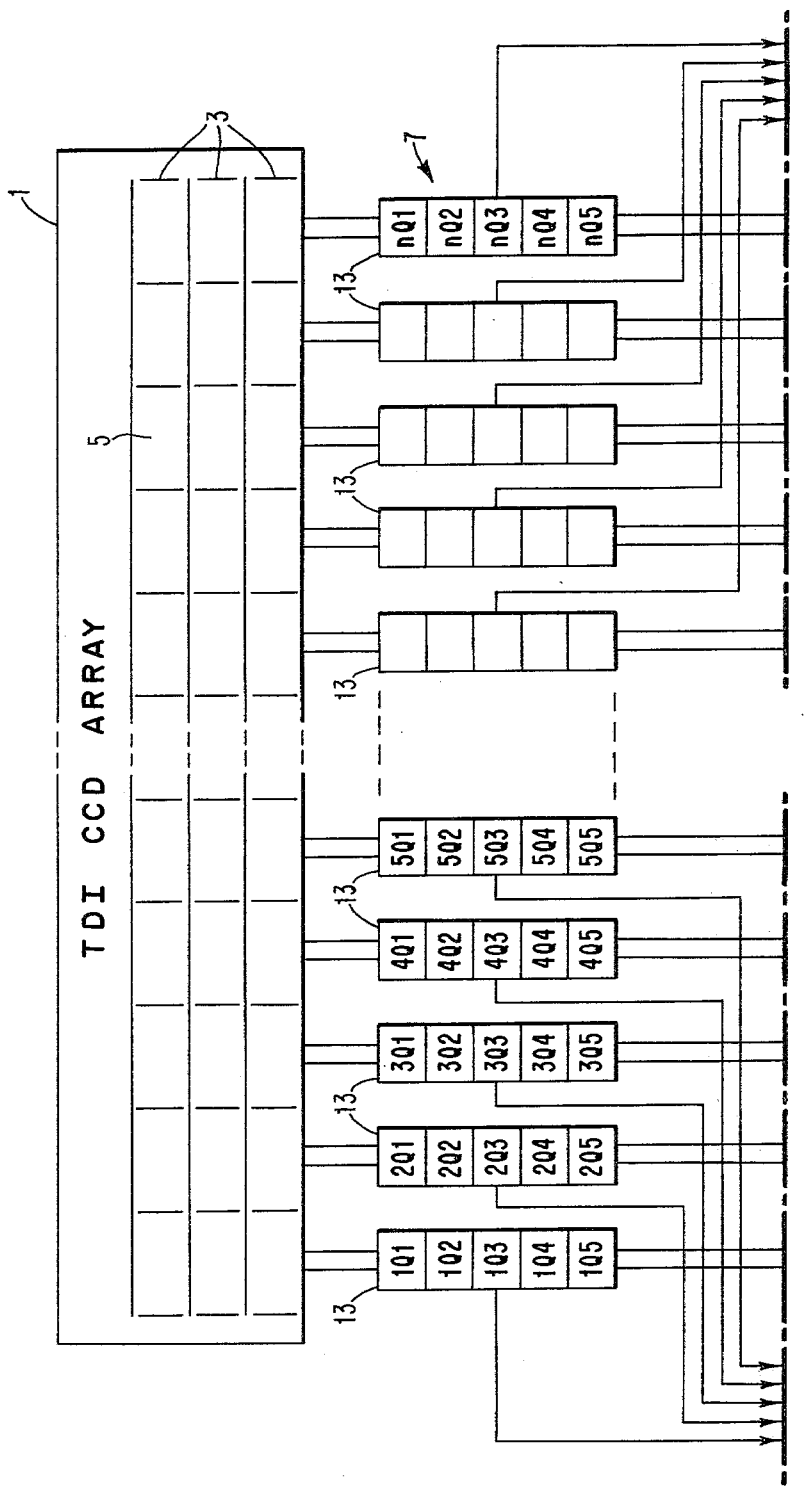

The remaining portion of this specification will describe preferred embodiments of the invention when read in conjunction with the attached drawings, in which like reference characters identify identical apparatus.

FIG. 1 illustrates a grid of charge packets such as is generated by an imaging device, for example a CCD, in response to an incident light image. The magnitude of each charge packet of the grid corresponds to the intensity of light measured by the CCD for a particular corresponding picture element of the incident image. Thus, charge packets 1P1–1P7 correspond to the light intensity registered at one column of picture elements of the incident image. Of course, successive columns of charge packets correspond to additional columns of picture elements of the image.

It is known in the art that the effectiveness of the image processing of such charge data may be enhanced and, in particular, the edges of a processed image may be more clearly defined, if the Laplacian is derived for at least some of the charge packets of the array of FIG. 1. The Laplacian for each element or pel of the array provides an indication of whether the particular element or pel represents a dark or a light tone for a processed image.

The Laplacian for each pel is calculated by measuring the average brightness within an area surrounding the pel, and subtracting the average brightness from the brightness measured at the pel. It has been determined that a 5×5 area of pels is satisfactory for many applications for obtaining an average brightness measurement. Thus, for example, if it is determined to measure the average brightness about the charge packet 3P3 of FIG. 1, it is necessary to sum the charges measured within an area five pels on a side and having the charge 3P3 at its center. More particularly, the average brightness about the pel 3P3 may be derived by computing an area sum:

$$\sum_{j=1}^{5} \sum_{k=1}^{5} {}_{j}P_{k},$$

where j designates the column position and k designates the row position of a charge packet. The Laplacian for 3P3 may then be approximated by subtracting a charge proportional to 1/25 of the area sum from the charge 3P3.

Thus, it should be understood that the Laplacian for the charge packets of FIG. 1 is computed by deriving a plurality of area averages for overlapping 5×5 pel areas. In general, the area sum for a charge packet $_CP_R$ is defined by:

$$\sum_{j=C-2}^{C+2} \sum_{k=R-2}^{R+2} {}_{j}P_{k}.$$

Figure 2B:
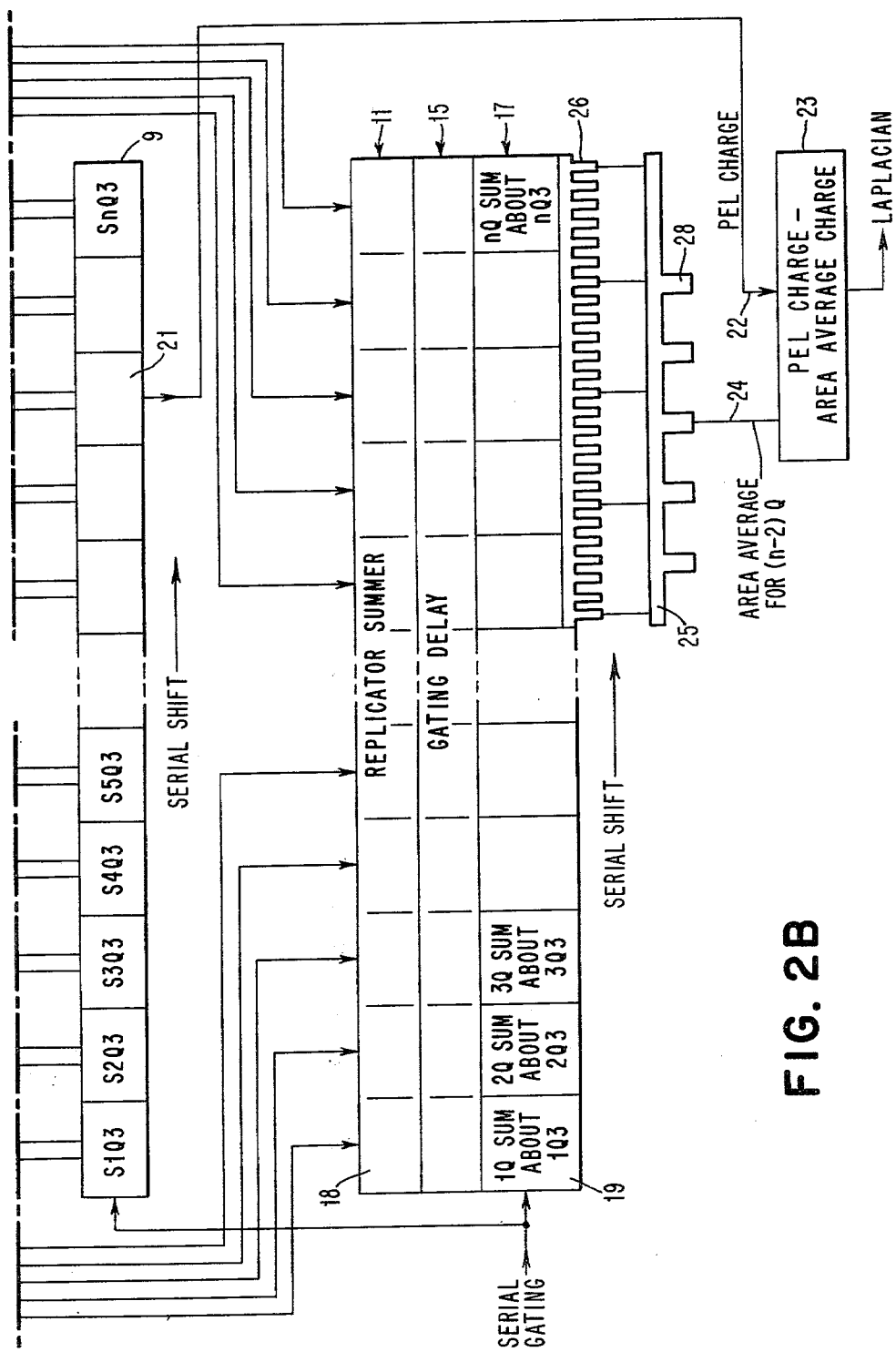

FIG. 2 illustrates a block diagram of a charge coupled apparatus, in accordance with the invention, that is employed to compute two dimensional area averages for the charge packets formed by a CCD imaging device 1 and to derive the Laplacian for each charge packet. The imaging device 1 of the preferred embodiment of FIG. 1 is operated in a time delay and integration mode to enhance the sensitivity of the array to incident light.

As is known to those skilled in the CCD imaging art, such a TDI array includes a plurality of horizontally oriented parallel shift registers 3 that each define a horizontal row of resolution elements or cells 5 that operate to convert incident light energy to a corresponding electric charge. The quantity of electric charge that is generated at a cell is, within known saturation limits, proportional to the intensity of the incident light and the time during which the incident light irradiates the cell of the CCD.

In operation, an incident light image is scanned downward across the rows of cells of the parallel registers 3 and the parallel registers are synchronously gated so that a plurality of charge packets corresponding to the picture elements of the image accumulate under the image as the image moves over the parallel registers. Thus, after a particular line of the image has moved over all of the parallel registers of the CCD array, a lower end row of cells of the array contains the final accumulated charge packets that correspond to the light intensity of the line. As charges are gated in parallel from the end row, new charges from the preceding row are gated into the end row.

In accordance with the invention, charge packets of the end row of the CCD array 1 are gated in parallel to associated cells 1Q1, 2Q1, 3Q1, 4Q1, 5Q1 . . . and nQ1 of a first row of a line image storage array 7. As each row of accumulated charge packets from the end row of the CCD array 1 is received by the first row of the line image storage array, preceding rows of the line image storage array are synchronously gated downwardly to make room for the added row of charge packets.

As the parallel gating through the line image storage array proceeds, the last row of charge packets at cells 1Q5, 2Q5, 3Q5, 4Q5, 5Q5 . . . and nQ5 are gated in parallel to associated cells S1Q3, S2Q3, S3Q3, S4Q3, S5Q3 . . . and SnQ3 of a focused picture element serial shift register 9. Thus, each cell of the serial shift register 9 contains a charge packet corresponding to the measured light intensity of a particular picture element of a line portion of an image that is scanned across the CCD array 1.

In accordance with the invention, a replicator summation circuit 11 is provided to non-destructively form replicated charge packets that are each proportional to the sum of the charges stored at a particular column 13 of the line image storage array 7 at a particular instant in time. Thus, the replicator summer will generate at position 18 a charge packet having a charge magnitude that is proportional to the sum of the charge packets stored at cells 1Q1, 1Q2, 1Q3, 1Q4 and 1Q5 of the associated 1Q column of the line image storage array 7. Successive positions of the replicator summer will have replicated charge packets corresponding to the sum of the charges stored at associated successive columns of the line image storage array.

Each row of replicated charge packets is gated in parallel to an area average serial shift register 17 through a gating delay device 15. The gating delay device 15 operates to gate a row of replicated charge packets into the serial shift register 17 at the same time that a corresponding row of middle charge packets is gated into the serial shift register 9. The middle charge packet for each replicated charge is the charge packet that was stored at a corresponding middle column position (1Q3, 2Q3, 3Q3, 4Q3, 5Q3 . . . nQ3) of the image storage array 7 when the replicated charge packet was formed. Thus, for example, the replicated sum of the charges stored at the 1Q column of the image storage array at a particular instant in time is gated into a cell 19 of the register 17 when the charge at the middle position 1Q3 of the column at the particular instant in time is gated into the position S1Q3 of the serial shift register 9. Accordingly, immediately after a parallel shift of charge packets into the registers 9 and 17, the register 17 will contain column sum charges and the register 9 will contain corresponding middle charges.

After a row of middle charges is gated in parallel into the shift register 9 and associated replicated column sum charge packets are gated in parallel into the shift register 17, the stored charge packets in the registers 9 and 17 are serially and synchronously gated to the right. When a middle charge packet of the register 9 is gated into a cell 21 of the register 9, the charge packet is applied to an input 22 of a comparator 23 that may be constructed and operated, for example, as shown in the IBM Technical Disclosure Bulletin, "Magnitude Differencing Circuit", by D. L. Critchlow et al, Vol. 18, No. 9, pg. 3071 (February 1976) or as disclosed in the U.S. patent application of James White, Non-Destructive Charge Transfer Device Differencing Circuit, Ser. No. 19,211, filed Mar. 9, 1979. The disclosures of the Technical Disclosure Bulletin and of the application are incorporated herein by reference.

A charge having a magnitude corresponding to the area average about the middle charge applied at the input 22 is applied to the other input 24 of the comparator 23 and the comparator generates a signal, for example a charge or a voltage, that is proportional to the difference between the two applied charges. The output signal of the comparator 23 is an approximation of the second derivative, or Laplacian, for the middle charge that is applied at the input 22. Of course, as the registers 9 and 17 are gated serially to the right, successive middle charges and associated area sum charges are applied to the comparator and corresponding Laplacian output values are generated. The Laplacian output values are applied to improve edge detection in a manner known to the art.

The area average charge for the middle charge packet stored at 21 is generated by dividing the sum of the replicated column sum charge packets of the last five cells of the serial shift registers 17 by 25. The division of the five replicated column sum charge packets may be performed by any manner known to the art. For example, as shown in FIG. 2, each of the replicated charge packets of the last five cells of the register 17 is initially divided by five by applying the charge packet to a split electrode charge divider 26 having five equal area electrodes. One electrode of each cell of the last five cells is then extended to conductively connect to a common bus 25 and the common bus 25 is shaped to form five additional split electrode charge dividers 28. A single electrode of the additional electrodes is extended to conductively connect to the input 24 of the comparator 23. Thus, 1/25 of the total charge stored at the last five cells is applied to the comparator 23.

As explained previously, the embodiment of FIG. 2 is employed to generate an area average for each image picture element, the area average being determined over a square area five pels on a side and centered about a particular focused pel. Thus, it will be appreciated that the line image storage array 7 of FIG. 2 is comprised of five storage rows that define the five pel vertical measurement of the averaging area. It should be understood that if a larger or smaller averaging area is desired, the number of storage rows of the line image storage array 7 may be adjusted accordingly. For example, if a 3×3 averaging area for each pel is desired, only 3 storage rows need be employed for the line image storage array of FIG. 2.

It should be further understood that each horizontal row of the line image storage array 7 may include any desired number of storage cells. Thus, although FIG. 2 illustrates only 10 cells in each horizontal row, any number of cells may be employed. For example, a typical device may have storage rows extending to include more than 2000 pels.

The horizontal dimension of the averaging area is determined by the number of cells that are included in computing the horizontal charge sum at the end of the serial register 17. In the preferred embodiment of the invention, the last five cells are employed to derive a horizontal sum. However, a larger or smaller number of cells may be used if a corresponding larger or smaller averaging area is desired.

If the vertical or horizontal extent of the averaging area is changed, the number of split electrode charge dividers must be altered accordingly. Thus, if an averaging area having a vertical dimension of m pels and a horizontal dimension of n pels is desired, m divider electrodes 26 are required for each of the last n cells of the register 17 and n divider electrodes 28 are required for the common bus 25.

Figure 3:
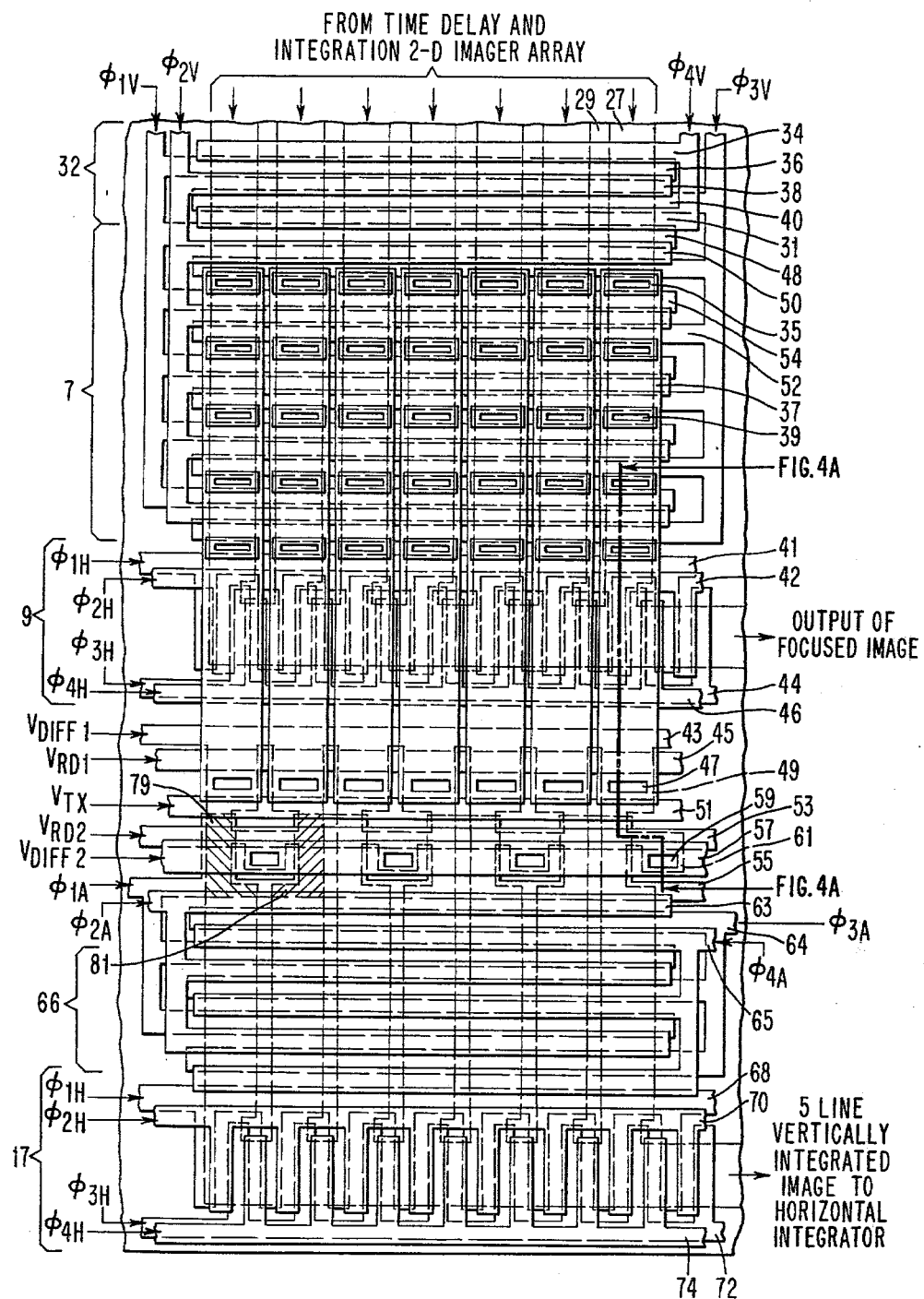
FIG. 3 illustrates a top elevation view of a portion of a CCD device in accordance with the invention.
Figures 4, 4A:
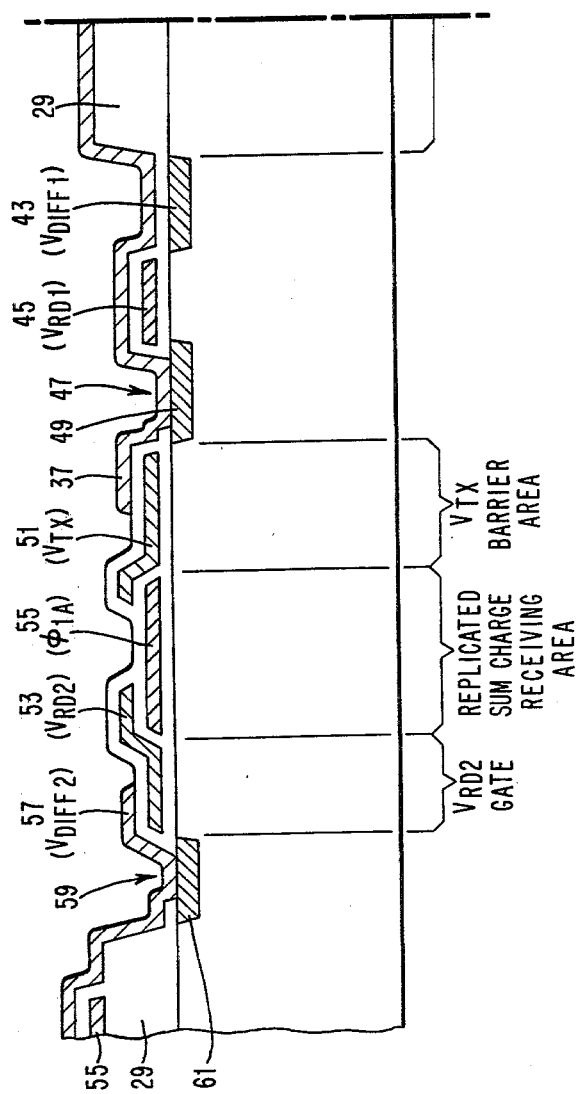
FIGS. 4A and 4B illustrate a cross-sectional side elevation view of the CCD apparatus of FIG. 2, taken along a line A—A in the direction of the arrows.
Figure 4B:
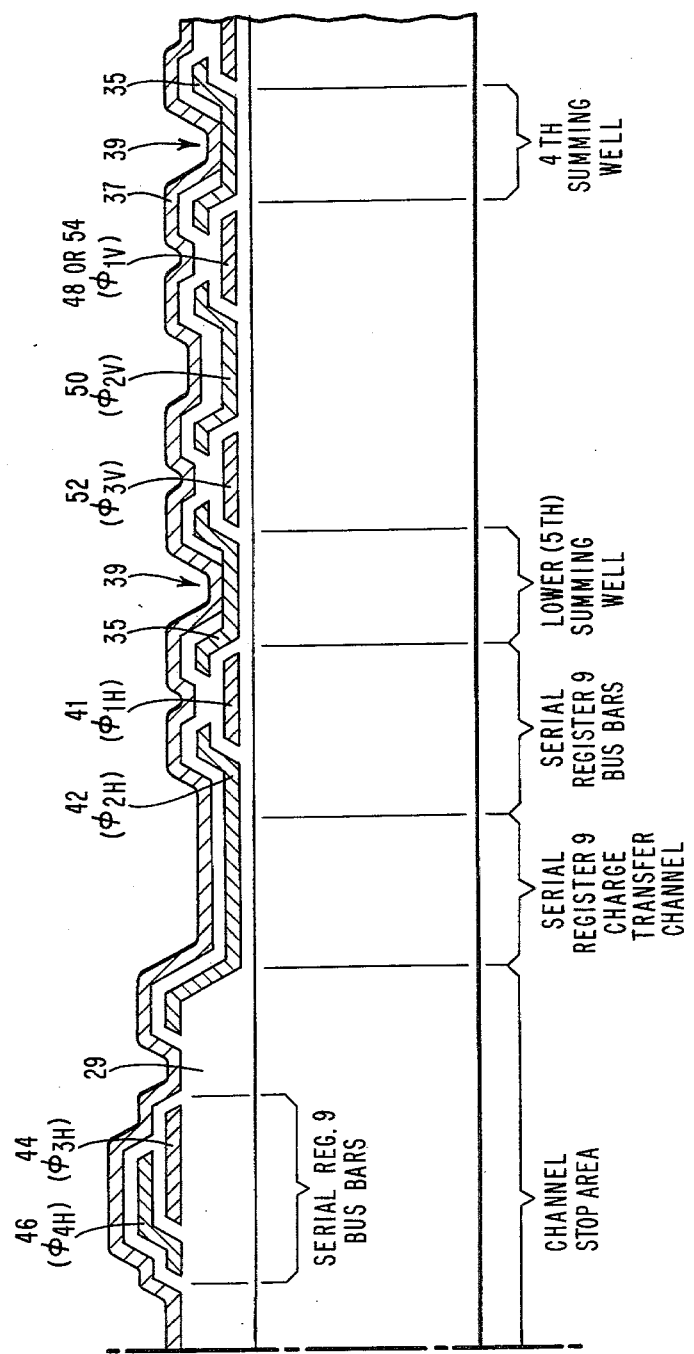

FIG. 3 illustrates a top elevation view of a charge coupled device that may be employed to generate an approximation of the second derivative for each of the picture elements of an imaging array. FIG. 4 illustrates a cross-sectional view of a portion of the CCD device of FIG. 3, taken along the line A—A in the direction of the arrows. As shown in FIG. 4, the CCD device of FIG. 3 is supported by a P-type substrate 30 that may be made, for example of silicon.

The device of FIG. 3 includes a CCD imaging array that may be operated in the time delay and integration mode to generate successive rows of charge packets corresponding to the intensity of the incident light at an associated row of cells or picture elements of the array. Such CCD/TDI imaging arrays are well known to the art and, therefore, the imaging portion at the top of the device of FIG. 2 is not completely illustrated.

It should be understood that although the device of FIG. 3 uses a CCD imaging array operated in the TDI mode, other known imaging devices may also be employed without departing from the spirit of the invention. For example, linear CCD arrays or photodiode arrays may also be employed to generate charge packets in response to an incident light image. Also, bucket brigade devices (BBDs) may be employed to generate charge packets in the TDI mode.

The last four parallel electrodes of the imaging array are shown to illustrate the means whereby a row of charge packets from the imaging array is applied to the Laplacian-generating apparatus of the invention. As shown in FIG. 3, the end portion 32 of the imaging array includes amorphous polysilicon parallel electrodes that are arranged in insulated, overlapping relation with respect to one another to gate a row of charge packets downwardly in response to serially applied $\phi_{1V}$, $\phi_{2V}$, $\phi_{3V}$ and $\phi_{4V}$ clock signals. The charge packets are moved along associated charge transfer channels 27 that are defined by strips of channel stop regions 29 that may be comprised, for example, of silicon dioxide and that are overlapped by the parallel polysilicon electrodes.

The parallel electrodes of the imaging array are embedded in insulating material, for example silicon dioxide, that supports and separates the electrodes at either a poly 1 level with respect to the substrate 30 or a poly 2 level. The topmost illustrated parallel electrode 34 is supported in the silicon dioxide at the poly 2 level and an adjacent overlapping parallel electrode 36 is supported in overlapping relation with the electrode 34 at the lower poly 1 level. The electrode 36 is supported above the surface of the substrate 30 by a layer of silicon dioxide and is separated from its associated overlapping electrode 34 by another layer of silicon dioxide.

The parallel electrode 34 is operated to form a row of potential wells to receive charge packets in response to an applied $\phi_{4V}$ clock signal. The adjacent electrode 36 forms adjacent energy wells to receive the charge packets in response to an applied $\phi_{1V}$ clock signal. A third illustrated parallel electrode 38 is positioned at the poly 2 level in overlapping relation to the parallel electrode 36 and is operated to form potential wells to receive charge packets in response to an applied $\phi_{2V}$ clock signal. The next successive electrode 40 is positioned at the poly 1 level and operates to form a row of potential wells in response to an applied $\phi_{3V}$ clock signal. The last parallel electrode 31 of the imaging array is positioned at level poly 2 and is operated to form potential wells and receive charge packets in response to a $100_{4V}$ clock signal.

The charge packets on the last parallel electrode 31 of the imaging array are received by a first parallel electrode 48 of the line image storage array 7 in response to the $\phi_{1V}$ clock signal. The parallel electrode 48 is positioned at level poly 1 and is arranged in overlapping relation with a second parallel electrode 50 that receives a row of charge packets in response to an applied $\phi_{2V}$ clock signal. An overlapping parallel electrode 52 is positioned at level poly 1 to receive charge packets from the parallel electrode 50 in response to an applied $\phi_{3V}$ clock signal. The electrode 52 is arranged in insulated overlapping relation to a first row of adjacent, separate column electrodes 35 that are each positioned at level poly 2 and that may be comprised, for example, of poly-silicon. Each of the column electrodes is positioned to receive a single charge packet from an adjacent portion of the overlapping input electrode 52. The column electrodes 35 are arranged in five rows, corresponding to the intended five row vertical dimension of the averaging area. It should be appreciated that the number of rows of column electrodes 35 will vary in accordance with the intended vertical dimension of the averaging area. For example, if it is desired to provide an averaging area having a three pel vertical dimension, there will only be three rows of column electrodes 35 provided for the device of FIG. 2. However, the preferred embodiment of FIG. 2 utilizes five rows of column electrodes 35 since it has been determined that an averaging area having a vertical dimension of five pels and a horizontal dimension of five pels is sufficiently large to provide an accurate approximation of the Laplacian for single pels for many useful applications.

For the sake of simplicity, only seven column electrodes are shown for each row of the line image storage array. However, it should be understood that the rows may include any number of column electrodes. In a preferred embodiment of the invention, in excess of 2000 column electrodes are used for each row.

The rows of column electrodes are separated by intermediate poly-silicon parallel gating electrodes that are responsive to the $\phi_{1V}$, $\phi_{2V}$ and $\phi_{3V}$ clock signals to move rows of charges between the rows of column electrodes. The intermediate parallel gating electrodes are arranged in insulated, overlapping relation as explained above.

Each column of column electrodes 35 is covered by a vertical cross-over electrode 37 made, for example, of aluminum. Each vertical cross-over electrode 37 is separated from its associated column of column electrodes by an insulating layer, for example of silicon dioxide. However, each column electrode 35 of a column is conductively connected to its associated cross-over electrode 37 by means of contact holes 39 that allow the conducting material of the cross-over electrodes to extend down to the poly 2 level to contact the associated column electrodes.

Thus, if a voltage signal is applied to a vertical cross-over electrode 37, the signal will also be applied to the associated column of column electrodes 35. Accordingly, potential wells may be created at each column electrode 35 of a particular column by applying a clock signal to the associated vertical cross-over electrode 37. It should be understood that if a potential well is created at a column electrode 35 in the above-described manner, the column electrode may receive a charge packet that is positioned under an adjacent overlapping parallel electrode. For example, each of the column electrodes 35 of the first row may receive charges stored at the associated overlapping parallel electrode 52 if a gating signal is applied to the associated vertical cross-over electrodes 37 and is removed from the electrode 52.

A charge packet may be removed from beneath a column electrode 35 if a $\phi_{1V}$ gating signal is applied to an adjacent, overlapping electrode. For example, a parallel electrode 54 may receive charge packets stored at the first row of column electrodes 35 in response to an applied $\phi_{1V}$ clock signal followed by the removal of the gating signal from the electrodes 37. Thereafter, the charges from a row of column electrodes 35 may be moved to the next successive row of column electrodes by serially applying the $\phi_{2V}$ and $\phi_{3V}$ gating signals to activate associated intermediate parallel electrodes and timely removing gating signals $\phi_{1V}$ and $\phi_{2V}$ to deactivate respective electrodes as charge is removed.

The vertical cross-over electrodes 37 pass over the serial shift register 9 and are separated from the apparatus of the serial shift register 9 by an insulating layer, for example of silicon dioxide. The serial shift register 9 is employed to receive successive rows of charge packets in parallel from the last row of column electrodes 35 and to thereafter gate each row of the received charge packets in a serial fashion.

The serial shift register 9 is comprised of four parallel, horizontally extending electrodes having vertically extending tabs arranged to form overlapping serial electrode portions that may be energized by sequentially applied serial clock signals $\phi_1 H$, $\phi_{2H}$, $\phi_{3H}$ and $\phi_{4H}$ to create associated serial potential wells. The serial wells are employed to store the received charge packets and to move the charge packets in a serial direction. A top electrode 41 of the shift register 9 is positioned at level poly 1 and is employed to receive the charge packets from the last row of column electrodes 35 of the line image storage array 7 in response to a $\phi_{1H}$ clock signal. A second electrode 42 is arranged at poly 2 in insulated overlapping relation to the top serial electrode 41 and is disposed to receive charge packets from the top serial electrode in response to a $\phi_{2H}$ clock signal. A third electrode 44 is disposed at level poly 1 and is arranged in insulated overlapping relation at its tab extensions to the second electrode 42 in order to receive the charge packets on the second serial electrode in response to an applied $\phi_{3H}$ clock signal. Likewise, a fourth electrode 46 is disposed at poly 2 in insulated overlapping relation to the third electrode 44 and is operated to receive the charge packets of the third electrode in response to an applied $\phi_{4H}$ clock signal. Sequential applications of the $\phi_{1H}$, $\phi_{2H}$, $\phi_{3H}$ and $\phi_{4H}$ gating signals cause stored charges in the serial shift register 9 to move in a serial direction to the right along a serial charge transfer path.

The vertical cross-over electrodes 37 also extend to cover a conductive source diffusion region 43 that is formed in the silicon substrate 30 and a poly-silicon gate electrode 45 that is positioned in insulated relation at level poly 1. Each vertical cross-over electrode 37 includes a contact hole 47 that extends to an underlying diffusion region 49 that is formed in the substrate 30 of the device. Each vertical cross-over electrode 37 is conductively connected to its associated underlying diffusion region 49 through its contact hole 47.

A poly-silicon reference electrode 51 is positioned at level poly 2 and is responsive to a threshold voltage signal $V_{TX}$ to form a reference barrier at a particular threshold level with respect to the diffusion regions 49. It should be understood that the source diffusion region 43, associated first gate electrode 45, and diffusion regions 49 form a line of IGFETs that may be operated by a gate signal $V_{RD1}$ on the first gate electrode 45 to apply a particular operational voltage $V_{DIFF1}$ on the source diffusion region 43 to the vertical cross-over electrodes 37.

A poly-silicon replica storage electrode 55 is disposed at level poly 1 and includes vertically extending tab portions that overlap the reference electrode 51 and are separated from the reference electrode 51 by an intermediate layer of silicon dioxide. The replica storage electrode 55 forms potential wells at its upwardly extending vertical tab portions in response to a $\phi_{1A}$ clock signal and thereby receives charge packets that pass from associated adjacent portions of the diffusion regions 49 and move past the potential reference barrier created at the reference electrode 51.

A second poly-silicon gate electrode 53 is positioned at level poly 2 in insulated overlapping relation with the vertical extending portions of the replica storage electrode 55. The second gate electrode 53 is separated from the replica storage electrode 55 by an insulating layer of silicon dioxide. A diffusion cross-over electrode 57 made, for example of aluminum, is disposed to overlap the second gate electrode 53 and is separated from the second gate electrode by an insulating layer of silicon dioxide. The diffusion cross-over electrode 57 has a plurality of contact holes 59, and each hole extends to an n+ drain diffusion region 61 that is disposed in the substrate of the device. The diffusion cross-over electrode 57 conductively contacts the drain diffusion regions 61 through the holes 59.

A charge may be drained from the potential wells formed at the replica storage electrode 55 by applying a gate voltage $V_{RD2}$ to the second gate electrode 53 to form a lower potential well at the gate electrode 53 and by applying a positive diffusion voltage $V_{DIFF2}$ to the diffusion cross-over electrode 57 to create drain wells that will receive the charges stored at the replica storage electrode 55.

It should be understood that the structure and positioning of the diffusion cross-over electrode 57 and associated replica storage electrode 55 is such that a hole 59 lies between each two adjacent vertically extending tab portions of the replica storage electrode. Therefore, the charges stored in potential wells at each pair of tab portions may be drained through the single associated contact hole to the adjacent n+ drain diffusion region 61. This compact structure allows a more efficient utilization of available space.

Parallel gating delay electrodes 63–66 are arranged in insulated overlapping relation to move charges stored in potential wells at the replica storage electrode 55 to the area average serial shift register 17. A first parallel gating delay electrode 63 is arranged at level poly 2 to receive charge packets from the replica storage electrode 55 in response to an applied $\phi_{2A}$ clock signal. A second parallel gating delay electrode 64 is arranged at level poly 1 to receive the stored charge at the parallel gating delay electrode 64 in response to an applied $\phi_{3A}$ signal. A third parallel gating delay electrode 65 is arranged at level poly 2 to receive stored charges from the second parallel gating delay electrode 64 in response to an applied $\phi_{4A}$ clock signal. The remaining parallel gating delay electrodes 66 are arranged in a similar fashion and are responsive to the sequentially applied $\phi_{1A}$, $\phi_{2A}$, $\phi_{3A}$ and $\phi_{4A}$ signals to move rows of charges in parallel to the area average serial shift register 17.

The area average serial shift register 17 includes four parallel, horizontally extending electrodes arranged in insulated overlapping relation and having vertically extending tabs arranged to form overlapping serial electrode portions that may be energized by sequentially applied serial clock signals $\phi_{1H}$, $\phi_{2H}$, $\phi_{3H}$ and $\phi_{4H}$ to create associated serial potential wells. The serial wells are employed to store the received charge packets and to move the charge packets in a serial direction.

A top electrode 68 of the shift register 17 is positioned at level poly 1 and is employed to receive the charge packets from the last electrode of the parallel gating delay electrodes 63–66 in response to a $\phi_{1H}$ clock signal. A second electrode 70 is arranged at level poly 2 in insulated overlapping relation to the top electrode 68 and is disposed to receive charge packets from the top electrode 68 in response to a $\phi_{2H}$ clock signal. A third electrode 72 is disposed at level poly 1 and is arranged in insulated overlapping relation at its tab extensions to the second electrode 70 in order to receive the charge packets on the second serial electrode in response to an applied $\phi_{3H}$ clock signal. Likewise, a fourth electrode 74 is disposed at level poly 2 in insulated overlapping relation to the third electrode 72 and is operated to receive the charge packets of the third electrode in response to an applied $\phi_{4H}$ clock signal. Sequential applications of the $\phi_{1H}$, $\phi_{2H}$, $\phi_{3H}$ and $\phi_{4H}$ clock signals cause stored charges in the serial shift register 17 to move in a serial direction to the right along a serial charge transfer path.

In operation, the charge coupled imaging array of the device of FIG. 3 generates rows of charge packets corresponding to the picture elements of lines of an incident light image. The charge packets of the successive rows are gated through the imaging array to the last parallel electrode 31 of the array in a conventional manner, for example utilizing the four clock signals $\phi_{1V}$, $\phi_{2V}$, $\phi_{3V}$ and $\phi_{4V}$.

The timing sequence of clock signals and the movement of rows of charge packets from the parallel electrode 31 may be best understood with reference to the timing diagram of FIG. 6. As shown in FIG. 6, a $\phi_{1V}$ clock signal and an overlapping $\phi_{2V}$ clock signal are applied to move a row of charge packets from the electrode 31 to the electrode 50, where the charge packets are separated from the row of column electrodes 35 by an intermediate electrode 52 that is controlled by the $\phi_{3V}$ clock signal. Thereafter, a gating signal $V_{RD1}$ is applied to the first gate electrode 45.

Figure 5:
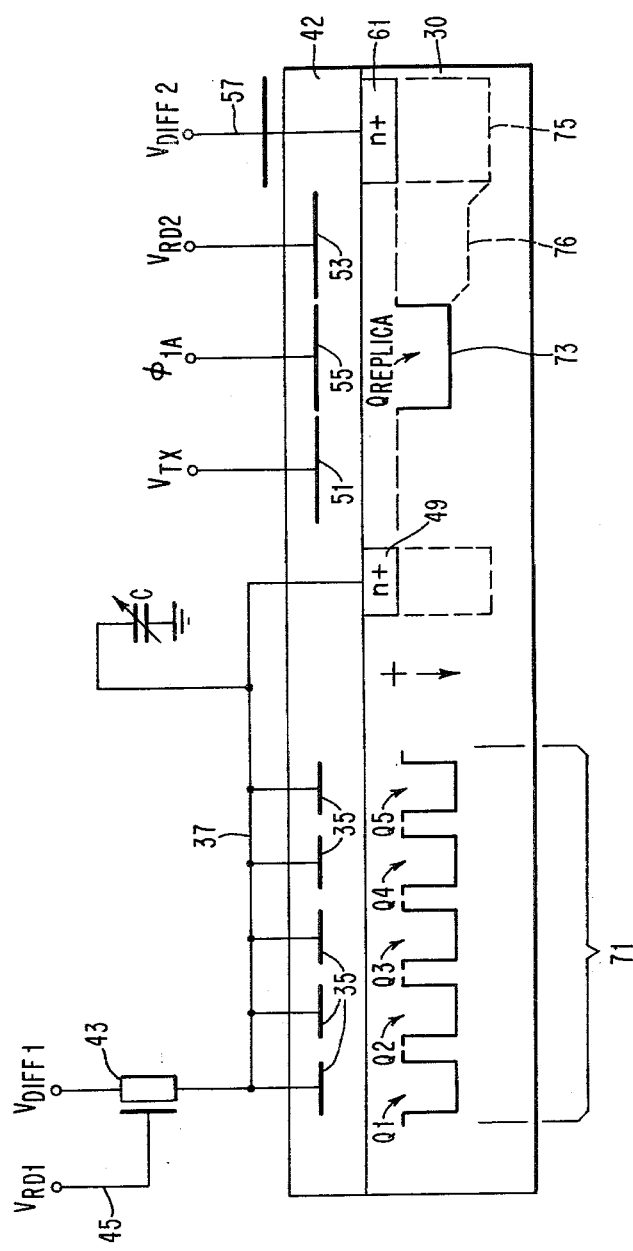
FIG. 5 illustrates a diagrammatic view of the electrodes and associated energy wells that are generated by the CCD device of FIG. 2 in creating a charge sum replica that is proportional to the sum of a column of stored charges.

As shown in the diagrammatic circuit diagram of FIG. 5, the diffusions 43 and 49 along with the gate electrode 45 form an IGFET that acts to apply a zero voltage $V_{DIFF1}$ signal to the diffusions 49 and to the vertical cross-over electrodes 37 and associated column electrodes 35 when the gate signal $V_{RD1}$ is applied. Thus, when $V_{RD1}$ is applied, the potential $V_c$ of the cross-over electrodes 37 and associated column electrodes is reduced to the zero voltage level of $V_{DIFF1}$, as shown in FIG. 6.

The diagrammatic illustration of FIG. 5 is intended to illustrate the relative positioning of the electrodes of the device of FIG. 3 with respect to the substrate 30 and associated silicon dioxide insulating layer 42 and also to show the relative positions of the potential wells that are formed in the device of FIG. 3. For simplicity, FIG. 5 illustrates a single column of column electrodes 35 and the associated potential wells 71 and single examples of the plurality of potential wells that are formed by other electrodes.

Referring to FIG. 6, it can be seen that a $\phi_{1A}$ signal is applied to the replica storage electrode 55 to create corresponding replica sum potential wells 73, one such potential well being illustrated in FIG. 5. In addition, a positive $V_{DIFF2}$ signal at a voltage level V, for example 8 volts, is applied to the diffusion cross-over electrode 57 to create drain potential wells 75 at the n+ drain diffusion regions 61 that are located adjacent each contact hole 59, as shown in FIGS. 4 and 5. A second gate signal $V_{RD2}$ is applied to a second gate electrode 53 to form potential wells 76 that connect the replica sum storage potential wells 73 and the drain potential wells 75.

A constant reference voltage $V_{TX}$ is applied to the reference electrode 51 to create a particular threshold reference barrier at a mid-range voltage level, for example $\frac{1}{2}V=4$ volts, between each diffusion region 49 and its adjacent replica sum potential wells 73 which exist in the channel under the $\phi_{1A}$ electrode 55 (i.e., replica storage areas 79 or 81).

When $V_{RD2}$ is applied, the $V_{DIFF2}$ voltage acts to pre-charge the diffusions 49, vertical cross-over electrodes 37 and column electrodes 35 to a potential $V_c$ that is equal to the voltage $V_{DIFF2}$ minus the threshold voltage $V_{TX}$ for the gates 51. An equilibrium condition is thereby established between the source diffusion regions 49 and the potential barriers created at the reference electrode 51 to provide a potential $V_c$ of $\frac{1}{2}V$ at the column electrodes 35 and to thereby form potential wells 71 at the column electrodes 35.

Although the potential wells 71 are formed beneath the column electrodes 35 in response to the application of $V_{RD1}$ and $V_{RD2}$ signals along with voltages $V_{DIFF1}$, $V_{DIFF2}$ and $V_{TX}$, the potential wells 71 do not receive charge packets since, as previously indicated, the charge packets are stored beneath $\phi_{2V}$ electrodes and, therefore, the charge packets are separated from the rows of column electrodes by intermediate $\phi_{3V}$ and $\phi_{1V}$ deactivated electrodes. Thus, for example, the deactivated electrode 52 separates the potential wells 71 of the first row of column electrodes 35 from the charges that are stored at the adjacent electrode 50.

In establishing the equilibrium condition, some residual equilibrium charge is caused to flow from the source diffusion regions 49, over the potential barriers of the reference electrode 51 and into the replica sum potential wells 73. The equilibrium charge is passed through the potential wells 76 formed at the second gate electrode 53 to the drain potential wells 75 formed by the diffusions 61 which are at the potential $V_{DIFF2}$. Thereafter, the $V_{RD2}$ signal is removed so that the drain potential wells 75 are isolated from the replica sum potential wells 73. Thus, following the application of the $V_{DIFF1}$, $V_{RD1}$, $V_{DIFF2}$ and $V_{RD2}$ signals, an equilibrium condition is established, empty potential wells are formed in a row beneath the replica storage electrode 55 and empty potential wells 71 are formed under the column electrodes 35. Thereafter, the $\phi_{3V}$ signal is applied so that charge packets stored at the electrodes controlled by the $\phi_{2V}$ signal are passed to the potential wells of associated rows of column electrodes 35 by way of the electrodes that are energized by the $\phi_{3V}$ signal.

The movement of charges, for example Q1, Q2, Q3, Q4 and Q5 into the potential wells 71 of each column of column electrodes 35 tends to return the equilibrium voltage toward zero on the associated vertical crossover electrodes 37. Thus, a recharge current is caused to flow in the electrodes 37 to restore the equilibrium voltage back to its original value and, when the current flows, charge is transferred from the diffusion regions 49, over the potential barrier at the reference electrode 51 and into the associated replica sum potential wells 73 of the replica storage electrode 55. The charge that flows to each well 73 is proportional to the sum of the charges stored in the wells 71 of an associated column of column electrodes. Thus, a row of replica sum charges is stored at the replica storage electrode 55 and each replica sum charge in the row corresponds to the sum of the charges that are stored under an associated column of column electrodes 35.

For example, for the leftmost column of column electrodes 35 of the line image storage array 7 of FIG. 3, a replica charge is formed under the cross-hatched portion 79 of the replica storage electrode 55 and the replica charge stored under the portion 79 is approximately equal to the sum of the charges stored under the column electrodes of the leftmost column. Likewise, a replica charge corresponding to the sum of the charges stored under the second leftmost column of column electrodes 35 is stored under the cross-hatched area 81 of the replica storage electrode 55. The magnitude of the replicated charges is independent of either the fixed reference potential $V_{TX}$ or a nonlinear depletion capacitance C that is formed by the parasitic effect between the diffusion regions 49 and the substrate 30.

Referring to FIG. 3, it can be seen that the replica storage areas 79 and 81 are positioned on either side of a contact hole 59 through which the diffusion crossover electrode 57 connects with the associated drain diffusion region 61. During the precharging interval when the signal $V_{RD2}$ and voltage $V_{DIFF2}$ are applied, the residual equilibrium charge that flows into either of the areas 79 and 81 is passed to the drain diffusion region 61 through the single central contact hole 59. The use of a single contact hole to provide a drain for adjacent replica storage areas is an important feature of the invention, since such a structure is extremely compact and makes sufficient use of the available space of the CCD device.

After the replicated sum charges are stored at the replica storage electrode 55, parallel gating delay electrodes 63–66 are energized in sequence to transfer the replicated charges to the area average serial shift register 17 in parallel. The replicated charges are then gated in a serial fashion from the register 17 by sequentially applying $\phi_{1H}$, $\phi_{2H}$, $\phi_{3H}$ and $\phi_{4H}$ serial clock signals. The serial clock signals are also simultaneously applied to gate associated "middle" charge packets from the focused element serial shift register 9.

As explained previously, the parallel gating delay electrodes 63–66 are employed to gate a row of replicated charge sums into the register 17 at the same time as particular associated middle charges are gated into the register 9. For example, if charges Q1, Q2, Q3, Q4 and Q5 are moved into the leftmost column of column electrodes 35 and are summed by the replicator apparatus of the invention, a replicated sum charge Qs will be formed at the area 79 on the replica storage electrode 55. The parallel gating delay electrodes 63–66 will then operate to pass the replicated sum charge Qs to the register 17 only when the associated middle charge Q3 is passed to the register 9. Thus, at the instant that a row of replicated sum charges is passed to the register 17, an associated row of middle charges is gated into the register 9.

For each replicated sum charge in the register 17, there is an associated charge in the register 9 that is the middle charge of the column of charges that was added to derive the replica sum charge. Accordingly, when the replica sum charges and associated middle charges are serially gated from the serial registers 9, 17 of the device of FIG. 3, the sum of any five replicated sum charge packets will be proportional to the sum of the charges in an area centered about a particular center charge packet of the register 9. More particularly, the center charge will be the "middle charge" that is associated with the third replica sum charge in the group of five summed replica sum charges.

FIG. 6 illustrates the sequence of timing signals that are required to move a row of middle charges into the third row of column electrodes 35 and down to the serial register 9, while simultaneously gating an associated row of replica sum charges to the register 17. Thus, it can be seen that a row of middle charges is gated in parallel into the third row of column electrodes when the $\phi_{3V}$ signal 82 is applied, following the application of the $V_{RD1}$ and $V_{RD2}$ signals. As explained above, the movement of charge into the third row of column electrodes causes corresponding replicated sum charges to appear at associated positions under the replica storage electrode 55. Thereafter, the row of middle charges and corresponding row of replicated sum charges are gated in the above-described manner so that the row of middle charges moves to the end row of column electrodes when the $\phi_{3V}$ pulse designated 83 is applied and the corresponding row of replica sum charges moves to the final parallel gating delay electrode when the $\phi_{4A}$ gating signal 87 is applied. The first serial gating pulse $\phi_{1H}$, designated 89, is applied to move the row of middle charges into the serial register 9 and the corresponding row of replicated sum charges into the serial register 17. Subsequent serial gating pulses are sequentially applied to gate the stored middle charges and replicated sum charges serially out of the registers before the next rows of charges are gated into the registers. Thus, after the first $\phi_{1H}$ pulse 89, the subsequent gating pulses are applied to gate charge packets from the registers 9 and 17 while the $\phi_{4A}$ signal and the potential $V_c$ are low.

Although the preferred embodiment of the invention is a charge coupled device wherein the charge carriers are electrons, it should be understood that the invention encompasses embodiments wherein the charge carriers are holes, such embodiments being implemented by modifying the apparatus of the invention in a known manner to provide compatible polarities, for example, by utilizing P+ diffusion regions and n type substrates.

Also, it should be appreciated that the clock signals that are applied to the designated electrodes are obtained from a system clock in a conventional manner and, therefore, the clocking means is not shown or described in detail, but can be understood from the timing diagram of FIG. 6. Voltage levels $+V$, $+\frac{1}{2} V$, $V_{DIFF1}=0$, $V_{DIFF2}$, and $V_{TX}$ are also intended to indicate relative levels only. Specific optimum values depend upon the peculiarities of the process used for specific devices.

It should be further understood that although the preferred embodiment of FIG. 2 utilizes four phase gating and is constructed in a two level scheme, other known structural or phase gating schemes may be employed without departing from the spirit of the invention. For example, an embodiment of the invention may be implemented utilizing two poly levels and two phase clock gating.

The invention is not limited to deriving area averages over square averaging areas, but may be employed to derive area averages for averaging areas of different shapes. For example, rectangular averaging means may be easily defined by using a number n of rows of column electrodes and a different number m of cells of the register 17 for horizontal summing in computing the charge sum for an averaging area. Moreover, each charge packet stored at the column electrodes need not be given the same "weight" when summed by the replicator apparatus of the invention. A different weight for a charge storage position may be obtained by using split column electrodes to divide a charge prior to summing, as disclosed in the paper by G. R. Nudd, P. A. Nygaard, G. D. Thurmond and S. D. Fouse, "A Charge-Coupled Device Image Processor for Smart Sensor Applications", *SPIE*, Vol. 155, Image Understanding Systems and Industrial Applications (1978).

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. A charge transfer device for measuring the radiation intensity of picture element portions of successive lines of an incident radiation image and deriving an average radiation intensity for an averaging area about each picture element, comprising:

imaging array means for generating a row of charge packets for each of said lines of the incident radiation image, the magnitude of charge of each charge packet proportional to the radiation intensity of a picture element portion of the corresponding line of radiation;

array means for receiving in parallel successive rows of charge packets from said imaging array means and storing n rows in sequence in a columnar relation, and for passing the nth stored row of charge packets from the array means for each row of charge packets that is received by the array means;

first serial register means for receiving in parallel each row of charge packets that is passed from the array means and for serially transmitting the charge packets of the received row;

column summing means responsive to at least the storing of a row of charge packets in said array means for forming a row of replicated charge packets, each replicated charge packet having a charge magnitude proportional to the sum of the charge packets stored at a particular associated column of the n rows of charge packets stored in the array means;

second serial register means for receiving in parallel a row of said replicated charge packets and serially transmitting the replicated charge packets of the received row; and gating delay means for gating a particular row of replicated charge packets in parallel from said column summing means and into said second serial register means when a particular corresponding row of charge packets is received by said first serial register means.

2. The charge transfer device of claim 1 including comparator means for receiving the serially gated charge packets of the first serial register means and the serially gated replicated charge packets of the second serial register means and for generating a plurality of output signals, each output signal having a magnitude proportional to the Laplacian of a charge packet of the first serial register means.

3. The charge transfer device of claim 2 wherein said column summing means includes, area averaging means for defining an area average of n×m charge packets for each charge packet $Q_F$ of the first serial register, the area averaging means including means for dividing each replicated charge packet $Q_R$ of the second serial register by n to form a corresponding divided replicated charge $Q_R/n$, means for combining m adjacent divided replicated charges for each charge packet $Q_F$ to form a corresponding partial sum charge packet $Q_P$;

means for dividing each $Q_P$ by m to form an area average charge packet $Q_A$ defining an average charge for the area about the corresponding charge packet $Q_F$; and means for subtracting the derived area average charge packet $Q_A$ from each associated charge packet $Q_F$ to derive the Laplacian for each $Q_F$.

4. The charge transfer device of claim 1 including means for defining said particular corresponding row of charge packets as the row of charge packets that is stored at the $(n+1)/2$ row of the array means at the time that the particular row of replicated charge packets is formed by said column summing means.

5. The charge transfer device of claim 1 wherein said imaging array means is a charge coupled imaging array operated in a time delay and integration mode.

6. A solid state charge transfer device, comprising:
a semiconductor substrate;

charge generator means for generating successive rows of charge packets;

a column array means having a plurality of array components, each component including a parallel electrode means and a storage electrode means arranged in insulated overlapping relation with one another and in insulated relation to said substrate, the array components arranged in a column to receive successive rows of charge packets in parallel from said charge generating means and to pass the rows of charge packets down the column of array components in parallel, each of said storage electrode means including a row of insulated column electrodes, the column electrodes of the array components forming columns;

a plurality of image output serial electrodes arranged in insulated overlapping relation and responsive to a plurality of serial transfer voltage signals for receiving a row of charge packets from the storage electrode means of a last array component of the column array means and for gating the received charge packets in a serial direction along a serial charge transfer path;

a plurality of insulated column cross-over electrodes, each cross-over electrode arranged to cover a particular column of the column electrodes and having means for conductively contacting the column electrodes in the particular column;

first diffusion electrode means arranged in said substrate and conductively connected to a source potential;

first gate electrode means arranged adjacent said first diffusion means in insulated relation to said first diffusion means and responsive to a first gating signal to apply said source potential to said plurality of column cross-over electrodes;

second diffusion electrode means conductively connected to a drain potential;

replica storage electrode means for forming a row of replica potential wells in response to a first replica gating signal;

a plurality of drain diffusion regions, each drain diffusion region arranged in said substrate and conductively connected to an adjacent area of said second diffusion electrode means for forming a plurality of drain potential wells, each drain potential well positioned adjacent at least one of the replica potential wells;

reference electrode means disposed adjacent charge transfer ends of said column cross-over electrodes for forming a reference potential barrier;

second gate means arranged in insulated overlapping relation to said second diffusion electrode means and said replica storage electrode means and responsive to a second gating signal to form one path for the flow of charge between each of said replica potential wells and a drain potential well and another path for the flow of charge from said reference potential barrier to said column cross-over electrodes;

a plurality of floating diffusion regions, each floating diffusion region arranged in said substrate adjacent a charge transfer end of an associated column cross-over electrode and conductively connected to the associated column cross-over electrode for applying said source potential to the column cross-over electrode in response to said first gating signal and for applying a portion of said drain potential to the column cross-over electrode in response to said second gating signal, each floating diffusion area supplying a replica sum charge to an adjacent replica potential well in response to the passing of charge packets to said storage electrode means, the replica sum charge of each floating diffusion region forming a replica charge packet having a charge magnitude proportional to the sum of the charges stored at the column electrodes covered by the associated column cross-over electrode;

a plurality of parallel gating delay electrodes arranged in insulated overlapping relation and responsive to said first replica gating signal and additional replica gating signals to receive a row of said replica charge packets in parallel and to gate the row of replica charge packets downwardly for a particular time delay period; and a plurality of replica charge serial electrodes arranged in insulated overlapping relation and responsive to a plurality of said serial transfer voltage signals for receiving a row of said replica charge packets from said parallel gating delay electrodes after said time delay period and gating the received replica charge packets in a serial direction along a serial charge transfer path.

7. The charge transfer device of claim 6 wherein said second diffusion electrode means is conductively connected to said drain diffusion regions through spaced apertures, each aperture positioned to define a drain potential well for receiving charge from two adjacent replica potential wells.

8. The charge transfer device of claim 6 wherein said charge generation means is a charge coupled imaging device operated in a time delay and integration mode.

9. The charge transfer device of claim 6 wherein said array means has an odd number of storage electrode means, the (n+1)/2 storage electrode means having a plurality of column electrodes that store columnwise centrally located charge packets at the time that corresponding replica charges are formed, said parallel gating delay electrodes operating to pass a row of replica charge packets to said replica charge serial electrodes when the corresponding columnwise centrally located charge packets are passed to the image output serial electrodes.

10. The charge transfer device of claim 6 including comparator means for receiving the charge packets serially gated by said image output serial electrodes and the replica charge packets serially gated by said replica charge serial electrodes and for generating a plurality of corresponding output signals, each output signal having a magnitude corresponding to the Laplacian of a charge packet gated by the image output serial electrodes.

* * * * *